United States Patent [19]

O'Donnell et al.

[11] Patent Number: 4,625,765
[45] Date of Patent: Dec. 2, 1986

[54] PLUG, FOR FLUID-SEALING OF TUBES

[76] Inventors: John W. O'Donnell, 1424 George St., Pt. Pleasant, N.J. 08742; Michael C. Catapano, 226 Clubhouse Dr., Middletown, N.J. 07748; Renato R. Noe, 1609 West St., Union City, N.J. 07087

[21] Appl. No.: 783,184

[22] Filed: Oct. 2, 1985

[51] Int. Cl.$^4$ .............................................. F16L 55/10
[52] U.S. Cl. ........................................ 138/89; 138/90
[58] Field of Search ................... 138/89, 90; 220/237, 220/233, 236; 73/49.1, 49.5, 49.8; 285/901

[56] References Cited

U.S. PATENT DOCUMENTS

| | | | |
|---|---|---|---|
| 3,817,086 | 6/1974 | Dorgebray | 138/90 |
| 3,857,414 | 12/1974 | Richardson et al. | 138/90 |
| 4,385,643 | 5/1983 | Noe | 220/237 |
| 4,427,112 | 1/1984 | DiGiovanni et al. | 138/90 |
| 4,474,216 | 10/1984 | Noe | 138/89 |
| 4,503,880 | 3/1985 | Hochman | 138/89 |

*Primary Examiner*—Stephen Marcus
*Assistant Examiner*—Leo Peters
*Attorney, Agent, or Firm*—Bernard J. Murphy

[57] ABSTRACT

In an embodiment shown, the plug comprises a body having a central, threaded bore in which is received the threaded shank of a nosepiece. Jaws are slidably engaged with a ramp surface of the nosepiece for effecting a gripping engagement with the inner surface of a tube to be sealed. The body has an abutment formed thereon against which to receive a compression washer and a plurality or O-ring seals interleaved with other compression washers. The shank of the nosepiece is threadedly movable extensibly from and retractably toward the body by use of a wrench engageable with a hexagonal recess formed in the body-engaging end of the shank. As the nosepiece is retracted, the jaws slide along, and expand upon, the ramp surface. The O-ring seals and compression washers set against the abutment of the body, as noted, and an internally-threaded nut is threadedly engaged with an externally-threaded end of the body which is opposite the nosepiece. Threaded movement of the nut causes the O-ring seals to be compressed and expand into sealing engagement with the inner surface of a tube. With failure of one or more of the O-ring seals, the nut, body and O-ring seals, with their compression washers, can be removed from the tube in which the plug is grippingly engaged, while the nosepiece and jaws remain gripped therein. Then, upon failed O-ring seals being replaced on the body, the latter, with the replacement seals and washers can be returned to the tube and threadedly re-engaged with the nosepiece.

10 Claims, 5 Drawing Figures

U.S. Patent  Dec. 2, 1986  4,625,765
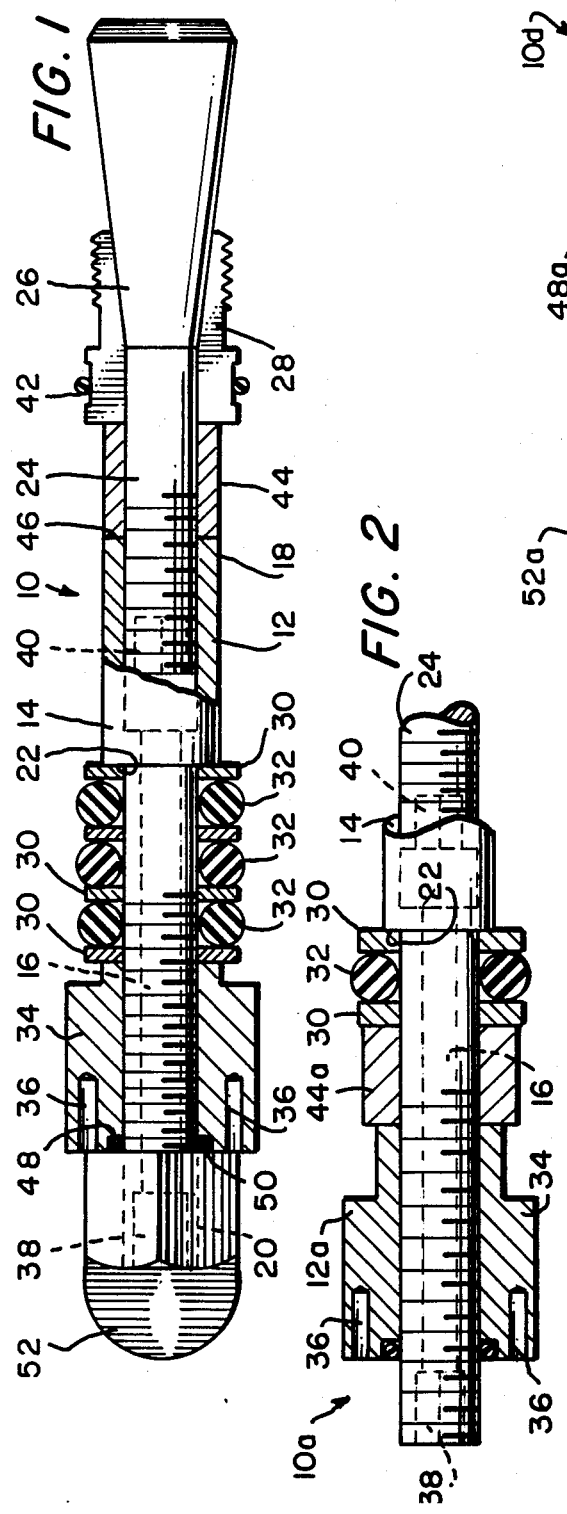
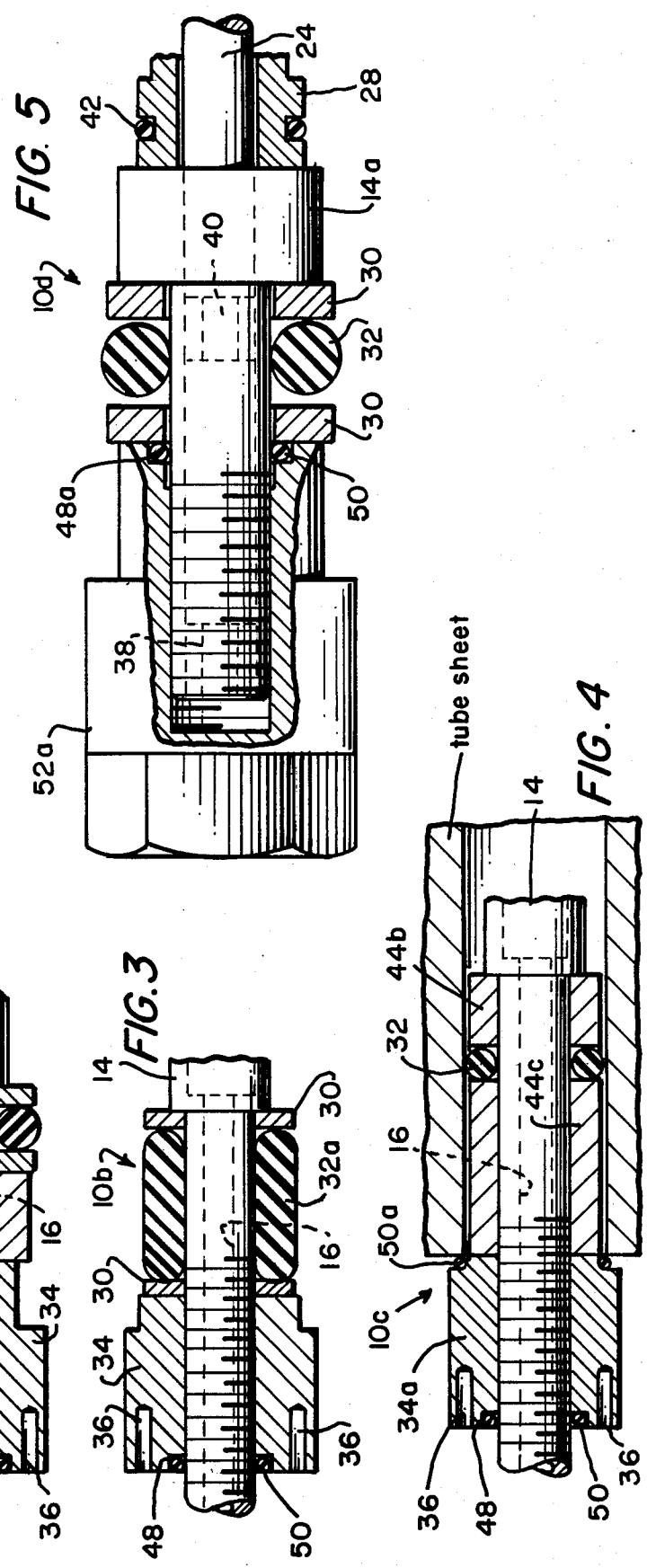

PLUG, FOR FLUID-SEALING OF TUBES

This invention pertains to plugs, and in particular to plugs designed for mechanical sealing of tubes, in tube-and-shell heat exchangers, or the like, having means for sealing off a tube and means for gripping the inner surface of such a tube.

The invention is similar, in many respects, to the Mechanical Seal Plugs, for Fluid-Sealing of Tubes, disclosed in U.S. Pat. No. 4,474,216, issued on Oct. 2nd, 1984, to Renato R. Noe (co-inventor of the instant invention). In the seal plugs of the aforesaid patent, it is necessary to remove the entirety thereof, from the tubes in which they are sealingly engaged to remove and replace the sealing elements thereof. In the circumstances in which the seal plugs are used, it would be more efficient and expeditious if the nosepiece thereof, and the gripping means associated therewith, could remain in the tube while the seals are replaced.

It is an object of this invention to set forth a plug, for fluid-sealing of tubes, so constructed that it accommodates the retention of the nosepiece and the associated grippers in the tube while the body and seals of the plug are removed for facile replacement of the seals, and re-engagement with the nosepiece.

Particularly, it is an object of this invention to set forth a plug, for fluid-sealing of tubes, comprising a plug body having a central, longitudinal axis; said plug body having means formed thereon defining an abutment; said body having a threaded bore formed axially therein; a nosepiece; said nosepiece having a shank portion which is externally threaded; said shank portion being threadedly engaged with said bore; said nosepiece having means manipulatable for causing said nosepiece to extend from, and retract toward, said body; said body also having an externally-threaded portion at one end thereof; a seal disposed in encircling engagement with said body intermediate said abutment and said one end of said body; an annular, seal-compressing means is disposed in encircling engagement with said one end of said body; wherein said seal-compressing means comprises a nut threadedly engaged with said externally-threaded portion of said body; and said body and said nut have means cooperatively manipulatable for causing said seal-compressing means to move along said body, toward said abutment, to cause said seal to be compressed and expanded into sealing engagement with an inner surface of a tube; and further including gripping means encircling said nosepiece, and movable relative thereto, for effecting fast, gripping engagement with the aforesaid, same, inner surface of a tube.

Further objects of this invention, as well as the novel features thereof, will become more apparent by reference to the following description, taken in conjunction with the accompanying figures, in which:

FIG. 1 is a longitudinal view of a first embodiment of the invention, portions thereof being shown in cross-section and cut-away;

FIG. 2 is a view like that of FIG. 1, of a portion of an alternative embodiment of the invention;

FIG. 3 is a longitudinal view of a portion of a third embodiment of the invention;

FIG. 4 is a longitudinal view of a portion of a fourth embodiment of the invention; and FIG. 5 is a longitudinal view of a portion of a fifth embodiment of the invention.

As shown in the figures, a first embodiment 10 of the invention comprises a plug 12 having a body 14 which has an axially-extended, through-going bore 16. One end 18 of the body is of a given diameter, and the end opposite 20 is of a smaller diameter. Where the two, diverse-diameter ends meet, intermediate the length of the body, is formed an abutment 22.

End 18 is internally threaded, and threadedly receives the threaded shank 24 of a nosepiece 26. Four jaws 28 (only two are shown) are resiliently clasped about the exterior of the nosepiece, each of the jaws 28 defining substantially a quadrant of a circle. The jaws 28 serve a clamping or gripping function quite as described for same jaws disclosed in the aforementioned U.S. Pat. No. 4,474,216; for the purposes of further explanation and/or clarification, the cited patent is incorporated by reference.

Set against the abutment 22, in serial fashion, are a compression washer 30, an O-ring seal 32, a compression washer 30, an O-ring seal 32, a comprssion washer 30, an O-ring seal 32, and a final comprssion washer 30. The compression washers 30 each have an outside diameter which, in this embodiment, is a little less than the outside diameter of the O-ring seals 32. Whereas the first of the compression washers 30 abuts against the abutment 22, the last of the compression washers abuts against the end face of a body nut 34. Nut 34 is internally threaded, and threadedly engages end 20 of the body which is also externally threaded. Formed in the outermost end or face of body nut 34 are four spanner wrench holes (only 2 are shown) 36. Finally, the thereadjacent, outermost end of the body 14 has a hexagonal recess 38 formed therein and terminating the bore 16.

In use, the plug 12 is inserted into a tube to be sealed, with the body nut 34 and the hexagonally-recessed end 20 of the body 14 accessible in the tube sheet. Then, by using a spanner wrench in the holes 36, and an Allen wrench in the recess 38, the body nut 34 is torqued up, tightly, against the O-ring seals and compression washers 32 and 30. Preferably the body 14 is held, by means of the Allen wrench, while the spanner wrench is turned to torque the body nut 34. As a consequence of this, the O-rings 32 become compressed and expanded into a fluid-sealing engagement with the inner surface of the tube being sealed. Next, the nosepiece 26 is drawn into the end 18 of the body 14. The innermost end of the shank 24 of the nosepiece has another hexagonal recess 40 formed therein. Recess 40 is accessed, by means of an Allen wrench, through the axially-extended bore 16 in the body 14. It will be appreciated that the greatest width, across the flats of the recess 40, is less than the inside diameter of the bore 16—so that a long-shaft Allen wrench can be passed through the bore 16 and enter the recess 40.

Quite as described in the aforesaid U.S. Pat. No. 4,474,216, the jaws 28 are held about the nosepiece by means of an O-ring 42 which nests in arcuate grooves provided therefor in the jaws. The inner ends of the jaws 28 are in contacting engagement with a spacer or compression ring 44 which also abuts the terminal end 46 of the body 14. Now then, as the nosepiece is drawn in, threadedly, into the body 14, the jaws are caused to ride up the diverging, ramp surface of the nosepiece, and incline, presenting the serrated, clamping surfaces thereof to the inner surface of the tube and, thus, firmly hold the plug 12 therein.

A last further sealing is done as follows. The body nut 34 has an annular recess 48 formed therein opening onto the threaded interior thereof. An O-ring 50 is set into recess 48, and it is clamped tightly in place by a surmounting cap nut 52. Cap nut 52 is made fast onto the recessed end 20 of the body 14.

In the manner just described, the plug 12 is gripped, securely, in the tube undergoing sealing, and the O-ring seals 32, having been compressed and, therefore, expanded, effect sure fluid sealing of the tube. However, if any one or more of the O-ring seals 32 decompose, or fail in any way, the same can be replaced, with great facility, without having to dislodge the entire plug 12 from the tube. Plug 12 accommodates the retention of the nosepiece 26 and jaws 28 in the tube, while the body nut 34, body 14, and O-ring seals 32 are withdrawn. This is done as follows.

The cap nut 52 is removed, together with the O-ring seal 50. Next, the spanner wrench, and an Allen wrench, are used again to untorque the body nut 34. This releases the O-ring seals 32 from compressed and expanded engagement with the tube. Finally, the Allen wrench is used in the recess 38 to unscrew the body 14 from the threaded shank 24 of the nosepiece 26. When the defective seal or seals 32 are replaced, the aforesaid procedure is reversed to return the body 14 to threaded engagement with the nosepiece shank 24 (and to put the new replacement seals into sealing engagement withthe inner tube surface). It is to be understood that, during such replacement of the O-ring seal(s) 32, the nosepiece 26 and jaws 28 remain in the tube, in a same, originally-effected, gripping engagement. Obviously, however, if there arises a need to remove the entirety of plug 12, with the nosepiece 26 as well, this too may be done. In such an eventuality, again, by using an Allen wrench in the recess 40, not to extend the nosepiece 26 outwardly from the body 14, the jaws 28 will relax their grip, and allow the whole plug 12 to be withdrawn from the tube.

It will be appreciated that the nosepiece end of the plug 12 enters the tube undergoing sealing, and the opposite end of the plug 12 is confined within the outermost end of the tube. Consequently, where the fluid being sealed is steam, or the like, the inner portion of the tube is exposed to the highest temperature of the fluid, whereas the outermost portion of the tube experiences a cooler, or at least a less elevated temperature. Now, elevated temperatures contribute to deterioration and/or other failure of the O-ring seals 32. As compared to the disposition of the O-ring seals in the embodiments shown in U.S. Pat. No. 4,474,216, plug 12 has the O-ring seals 32 disposed on that end of the plug 12 which is more adjacent to the outermost, rather than the innermost end thereof. As a result of this, O-ring seals 32 will experience a lower mortality, and require less frequent replacement.

The alternative embodiment 10a, only that portion thereof which differs from embodiment 10 being shown in FIG. 2, comprises a plug 12a similar to plug 12 of FIG. 1; hence, same or similar index numbers used in FIG. 2 denote same or similar components as those in FIG. 1.

Plug 12a differs from plug 12 only in the particular sealing arrengement thereof. Here, a single O-ring seal 32 is used, the same having a pair of compression washers 30 astride it. One of the washers is set against the abutment 22. The other washer 30 is set against the innermost face of a compression ring 44a. The body nut 34 is set against the other, outermost face of the compression ring 44a.

A further alternative embodiment 10b, only that portion thereof which differs from embodiment 10 being shown in FIG. 3, comprises a plug 12b which, again, is similar to plug 12 of FIG. 1. Again, plug 12b differs from plug 12 (and plug 12a) only in its sealing arrangement. In this embodiment, a compression washer 30 is set against the abutment 22, and a wide elastomer seal 32a is sandwiched between it and another compression washer 30. The inner face of the body nut 34 closes upon the outermost compression washer 30.

A fourth alternative embodiment 10c of the invention is depicted in FIG. 4, only partially. All that is shown in FIG. 4 is that much of embodiment 10c which differs from embodiment 10 (of FIG. 1). In this practice of the invention a single O-ring seal 32 is interposed between compression rings 44b and 44c, the latter all circling the smaller diameter portion of the body 14. Here, however, the body nut 34a has an innermost arcuate gland in which a seal 50a is compressed against the face of the structure in which sealing is to be effected. Again, a seal 50 seats in a gland or recess 48, in the opposite end of the nut 34a. A cap nut 52, as in the FIG. 1 embodiment, is fixed on the end of body 14 and sealingly closed up against the seal 50.

A final, fifth embodiment of the invention is illustrated in FIG. 5, but here too only partially, to depict just that much thereof which differs from embodiment 10 of FIG. 1. The body 14a threadedly receives the threaded shank 24 of the nosepiece 26, and the shank has the hexagonal recess 40 in the end thereof. One O-ring seal 32 set between two compression washers 30, the same all encircling the body 14a at the smaller diameter, externally-threaded end thereof. Then, a hexagonal cap nut 52a is threadedly fixed onto the aforesaid end of the body 14a. The nut 52a has a gland 48a in which it nests a seal 50 for sealingly engaging the face of the there-abutting face of one of the compression washers 30.

While we have described our invention in connection with specific embodiments thereof, it is to be clearly understood that this is done only by way of example and not as a limitation to the scope of our invention, as set forth in the objects thereof and in the appended claims.

We claim:

1. A plug, for fluid-sealing of tubes, comprising:
a plug body having a central, longitudinal axis;
said plug body having means formed thereon defining an abutment;
said body having a threaded bore formed axially therein;
a nosepiece;
said nosepiece having a shank portion which is externally threaded;
said shank portion being threadedly and removably engaged with said bore;
said nosepiece having means manipulatable for causing said nosepiece to extend from, and to retract toward said body;
said body also having an externally-threaded portion at one end thereof;
a seal disposed in encircling engagement with said body intermediate said abutment and said one end of said body; and
annular, seal-compressing means disposed in encircling engagement with said one end of said body; wherein said seal-compressing means comprises a nut threadedly engaged with said externally-threaded portion of said body; and said body and said nut have means cooperatively manipulatable for causing said seal-compressing means to move along said body, toward said abutment, to cause said seal to be compressed and expanded into sealing engagement with an inner surface of a tube; and further including gripping means encircling said nosepiece, and movable relative thereto, for effecting fast, gripping engagement with the aforesaid, same inner surface of a tube.

2. A plug, for fluid-sealing of tubes, according to claim 1, wherein:

said cooperatively manipulatable means of said body and said nut comprise spanner wrench holes formed in said nut and a hexagonal recess formed in said one end of said body.

3. A plug, for fluid-sealing of tubes, according to claim 1, wherein:

said seal comprises a plurality of O-ring seals interposed between said abutment and said seal-compressing means; and further including a compression washer interposed between an adjacent pair of said O-ring seals.

4. A plug, for fluid-sealing of tubes, according to claim 1, wherein:

said seal comprises three O-ring seals interposed between said abutment and said seal-compressing means; and further including a first compression washer interposed between one of said O-ring seals and said abutment, second compression washers interposed between said one O-ring seal and another thereof adjacent thereto, and between said another O-ring seal and the third of said O-ring seals, and another compression washer interposed between said third o-ring seal and said nut.

5. A plug, for fluid-sealing of tubes, according to claim 1, wherein:

said seal comprises an elastomer annulus having a given thickness through a sector thereof, and an axial length greater than said given thickness.

6. A plug, for fluid-sealing of tubes, according to claim 1, wherein:

said seal comprises an O-ring seal interposed between said abutment and said seal-compressing means; and further including a pair of compression washers astride said O-ring seal, one of said washers being interposed between said O-ring seal and said abutment, and the other thereof being interposed between said O-ring seal and said seal-compressing means; and wherein said seal-compressing means further comprises a compression ring in abutting relationship with said other compression washer.

7. A plug, for fluid-sealing of tubes, according to claim 1, wherein:

said manipulatable means of said nosepiece comprises a hexagonal recess formed in said shank portion.

8. A plug, for fluid-sealing of tubes, according to claim 1, wherein:

said seal-compressing means further comprises an annular element interposed between said seal and said nut.

9. A plug, for fluid-sealing of tubes, according to claim 1, further including:

a cap nut threadedly engaged with said one end of said body, in abutting engagement with said nut of said seal-compressing means; and an O-ring seal interposed between said cap nut and said nut of said seal-compressing means.

10. A plug, for fluid-sealing of tubes, according to claim 1, wherein:

said nut has an arcuate recess formed in an axial face thereof for nestingly receiving therein an O-ring seal for sealingly engaging the face of a structure in which fluid-sealing of a tube is to be done.

* * * * *